United States Patent [19]
Young et al.

[11] Patent Number: 5,704,828
[45] Date of Patent: Jan. 6, 1998

[54] SAW BLADE WITH SANDING SURFACE

[75] Inventors: Gregory E. Young, Chino Valley; Penrod C. Geisinger, Prescott Valley, both of Ariz.

[73] Assignee: Vaporless Manufacturing, Inc., Prescott Valley, Ariz.

[21] Appl. No.: 626,339

[22] Filed: Apr. 2, 1996

Related U.S. Application Data

[63] Continuation of Ser. No. 296,682, Aug. 26, 1994, Pat. No. 5,529,528.

[51] Int. Cl.$^6$ .................. B24B 27/06; B24D 18/00
[52] U.S. Cl. .................. 451/461; 76/112; 83/676; 83/837
[58] Field of Search .................. 451/69, 70, 461, 451/182, 241, 552, 540, 462, 541, 542, 548; 76/112; 83/837, 469, 676; 125/15

[56] References Cited

U.S. PATENT DOCUMENTS

| | | |
|---|---|---|
| 14,268 | 2/1856 | Kern .................. 83/676 |
| 118,800 | 9/1871 | Green . |
| 361,238 | 4/1887 | Proctor . |
| 479,332 | 7/1892 | Patten . |
| 484,639 | 10/1892 | Larish . |
| 1,022,692 | 4/1912 | Meyers . |
| 1,139,817 | 5/1915 | Smith .................. 451/548 |
| 1,269,563 | 6/1918 | Smith .................. 451/548 |
| 1,269,653 | 6/1918 | Smith . |
| 2,033,263 | 3/1936 | Tone .................. 51/278 |
| 2,382,257 | 8/1945 | Ransay .................. 51/3 |
| 2,451,295 | 10/1948 | Metzger et al. .................. 51/209 |
| 2,524,323 | 10/1950 | Lloyd-Young .................. 51/195 |
| 3,110,985 | 11/1963 | Brauchle .................. 51/102 |
| 3,776,072 | 12/1973 | Gerber et al. .................. 83/34 |
| 4,338,748 | 7/1982 | Elbel .................. 51/206 |
| 4,675,975 | 6/1987 | Kucharczyk et al. .................. 29/566 |
| 5,115,796 | 5/1992 | Schweickhardt .................. 125/13.01 |
| 5,311,705 | 5/1994 | Zuzelo .................. 451/541 |

*Primary Examiner*—Robert A. Rose
*Attorney, Agent, or Firm*—Cahill, Sutton & Thomas P.L.C.

[57] ABSTRACT

A saw blade includes a very shallow cone shaped side for supporting an abrasive surface to sand smooth a cut surface of a work piece while the surface is being cut by the saw blade. To maintain the finished sanded surface of the cut perpendicular to a specified axis of the work piece, the axis of rotation of the saw blade is tilted to place a radial of the cone shaped abrasive surface orthogonal in three axis to the direction of saw cut being made.

20 Claims, 2 Drawing Sheets

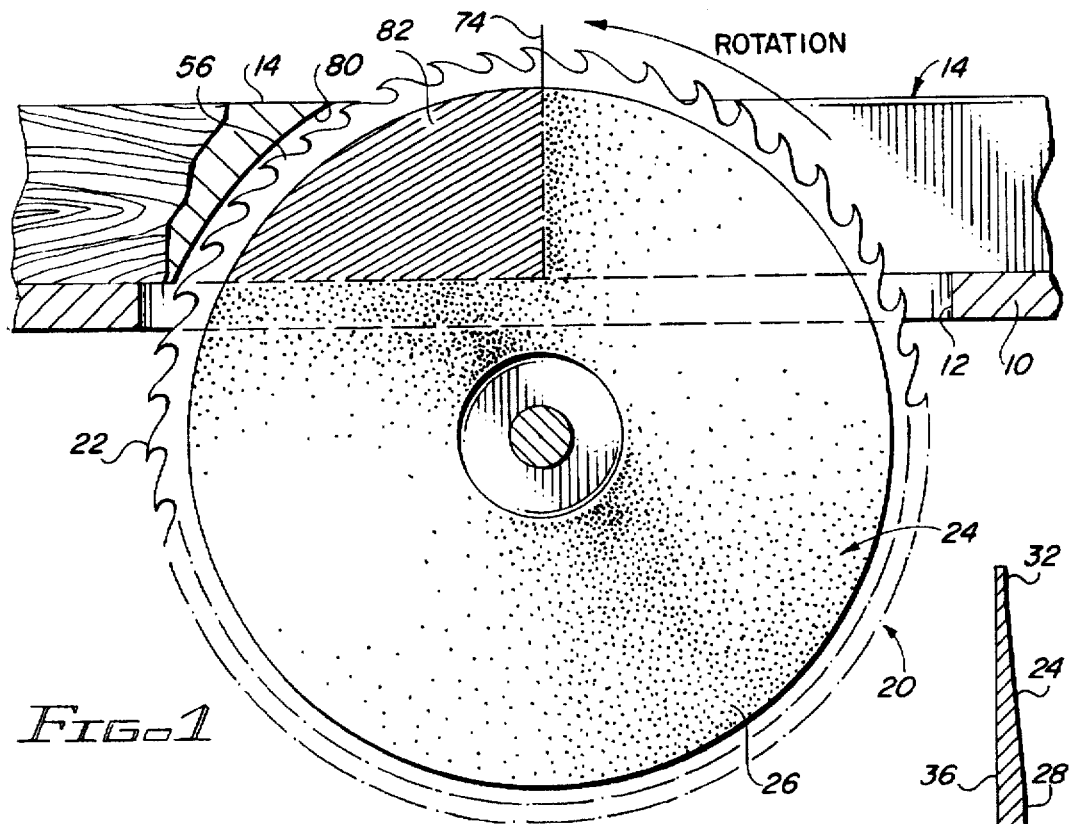
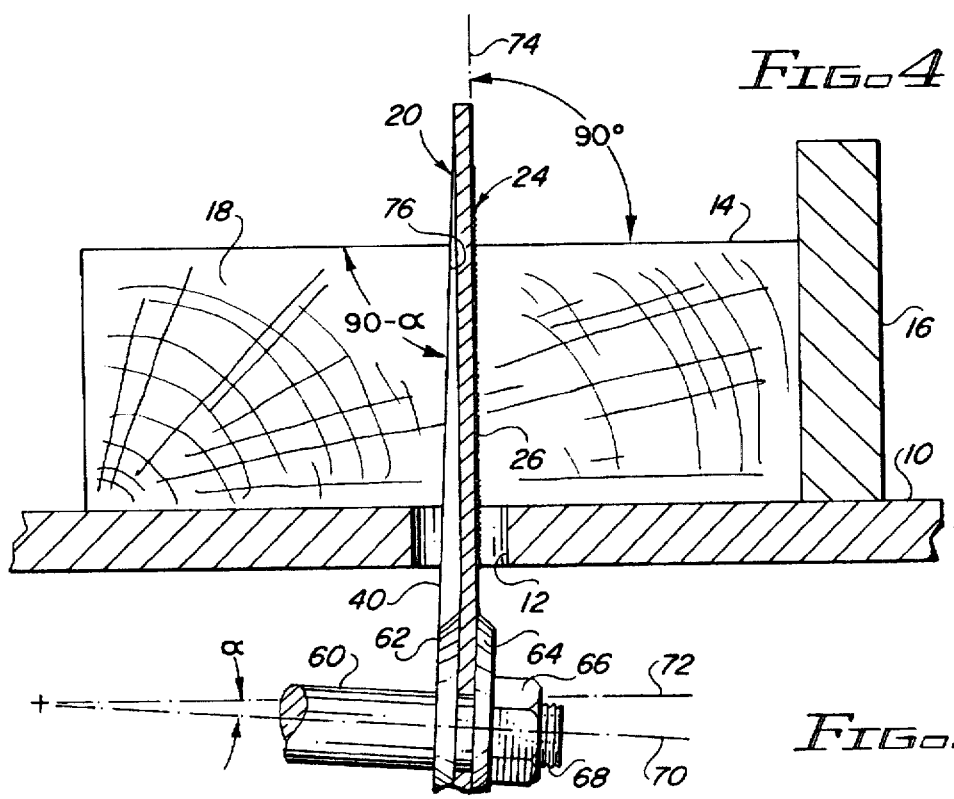

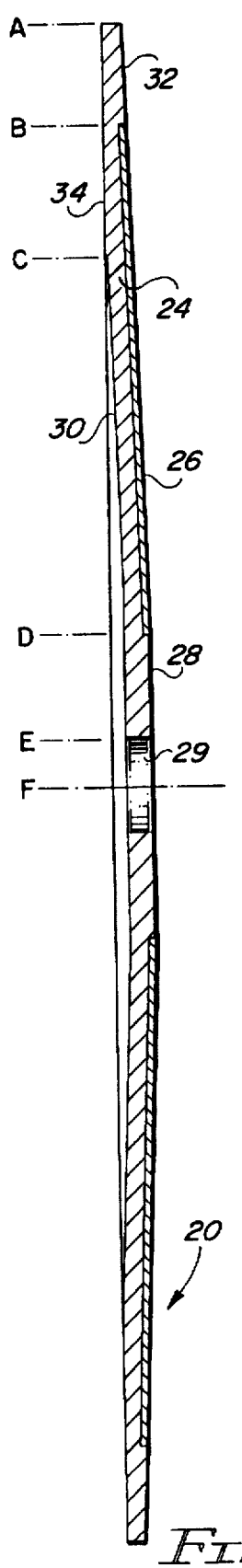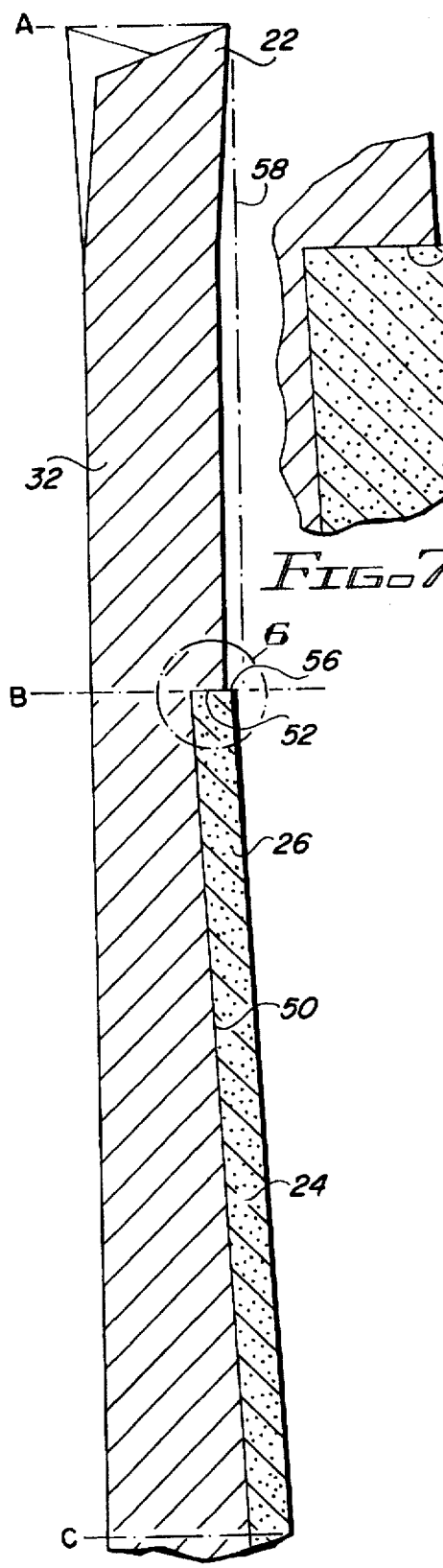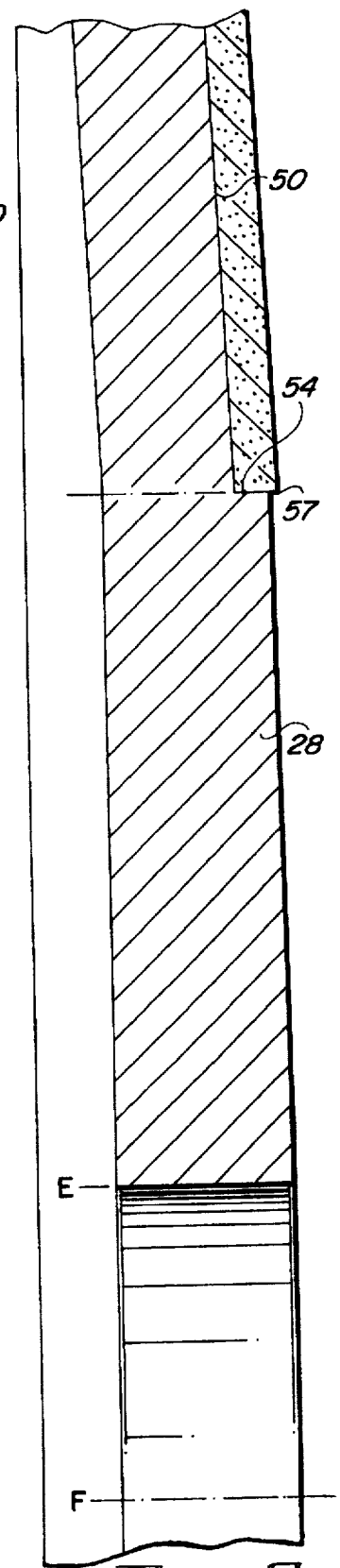

5,704,828

SAW BLADE WITH SANDING SURFACE

This is a continuation of prior application Ser. No. 08/296,682, filed Aug. 26, 1994, now U.S. Pat. No. 5,524,528, for "SAW BLADE WITH SANDING SURFACE".

BACKGROUND OF THE INVENTION

1. Field of the Invention

The present invention relates to saw blades and, more particularly, to rotary saw blades incorporating an abrasive surface for simultaneously cutting and finishing the surface of a work piece.

2. Description of Prior Art

Saw blades for use with rotary saws include offset or non-offset teeth. If offset teeth are employed, the kerf is wider than the thickness of the saw blade which wastes material but prevents binding between the work piece and the saw blade. The smoothness of the cut surface in the work piece is generally a function of the size of the teeth, the configuration of the teeth, and the number of teeth per unit of circumference. Generally, a fine toothed rotary saw blade will make a more finished cut than a coarse toothed saw blade. The latter, however, provides a more rapid cut, and is therefore preferable in many applications. Depending upon the purpose of the work piece, saw cuts made therein may have to be sanded smooth or finished by an abrasive tool, such as sandpaper. This step adds to the costs of making the saw cut in terms of additional equipment being required, the costs attendant a workman sanding the cut and costs attendant more time required to construct the finished product. If it were possible to eliminate the extra step of sanding the cut surface in the work piece, significant savings could be realized.

Various attempts have been made to incorporate an abrasive or a sanding element with a rotary saw blade. Such attempts include the forming of teeth on a side of a saw blade; if such teeth do not extend laterally beyond the plane of the cut being made, they cannot serve their purpose. Abrasive elements and sanding disks have been added to a side of a saw blade to perform a finish sanding function commensurate with a saw cut being made. Because such abrasive materials, sandpaper, or even teeth extending from the side of a saw blade contact the work piece at the perimeter of the abrasive, sandpaper or teeth, the peripheral edge performs most of the sanding function. This causes rapid wear due to a high concentration of forces present at the perimeter or peripheral edge.

SUMMARY OF THE INVENTION

A rotary saw blade includes a shallow cone shaped surface for supporting a shallow cone of sandpaper, abrasive material or other element capable of performing a sanding function as it passes across a work piece. By orienting the axis of rotation of the rotary saw blade to place a radial of the sanding surface orthogonal to two axis of the direction of travel of the saw blade past the work piece, the cut surface of the work piece will come in contact with a significant area of the sanding surface. Due to the angular orientation of the sanding surface, material of the work piece will be gradually sanded away until a flat smooth surface angularly oriented with the work piece at a predetermined angle is achieved. Because a significant part of the sanding surface simultaneously performs the sanding function, wear will be relatively uniform.

It is therefore a primary object of the present invention to provide a rotary saw blade for cutting and sanding smooth a cut surface made in a work piece.

Another object of the present invention is to provide a rotary saw blade having a sanding surface acting relatively uniformly across a cut surface made in a work piece.

Still another object of the present invention is to provide a rotary saw blade having a shallow cone shaped surface supporting a sanding surface.

Still another object of the present invention is to provide a rotary saw blade for finishing a cut surface of a work piece.

A further object of the present invention is to provide a rotary saw blade for cutting and finishing any angled cut surface made in a work piece.

A yet further object of the present invention is to provide a rotary saw blade having offset or teeth with a sanding surface to perform a sanding function on a cut surface being made.

A still further object of the present invention is to provide a method for cutting and finishing a surface of a work piece with a rotary saw blade.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a rotary saw blade having a cone shaped sanding surface for making a finished cut surface in a work piece;

FIG. 2 is a side view illustrating the angular orientation of a rotary saw blade having a shallow cone shaped surface with respect to a work piece;

FIG. 3 is a cross sectional view of a shallow cone shaped rotary saw blade having a sanding surface;

FIG. 4 is a cross sectional view of a rotary saw blade having a shallow cone shaped side and a planar obverse side;

FIG. 5 is a partial cross sectional view illustrating the outer perimeter of a sanding surface formed on a rotary saw blade;

FIG. 6 is a partial cross sectional view illustrating the inner perimeter of a sanding surface formed on a rotary saw blade; and FIG. 7 is a detailed view taken within circle 6 illustrated in FIG. 5.

DESCRIPTION OF THE PREFERRED EMBODIMENT

Referring to FIG. 1, there is illustrated a conventional work table 10 for use in conjunction with a rotary saw blade. The work table includes a slot 12 through which a rotary saw blade extends to perform a cut upon a work piece 14. As particularly shown in FIG. 2, work table 10 may include a fence 16 against which work piece 14 is transported past the rotary saw blade. Rotary saw blade 20 embodying the present invention includes conventional teeth 22 disposed along its perimeter. These teeth may be offset or not, depending upon the type and nature of the cut to be performed.

The basic structure and configuration of rotary saw blade 20 will be described with joint reference to FIGS. 1, 2 and 3. The rotary saw blade includes a generally shallow cone shaped surface 24 defining a cone angle preferably in the range of 1° to 3° off a plane perpendicular to the axis of rotation of the rotary saw blade. This cone shaped surface may be wholly or partially covered by an abrasive material 26 generally defining a shallow cone shaped disk. The abrasive material may be an apertured disk of sandpaper, abrasive particulates bonded to cone shaped surface 24, teeth formed in cone shaped surface 24, or the like.

Rotary saw blade 20 may be formed from a circular disk that has been made dish shaped by metal forming machinery or machined to size and configuration. It includes a central flat roundel 28 with a radius extending from F to D and an aperture 29 with a radius extending from F to E. A ring 30 extending radially from D to B may be formed or machined to a dish shape having a shallow cone defining cone shaped surface 24. A peripheral radial band 32 extending from radius B to radius A is flat and parallel with a plane defined by roundel 28; band 32 also includes teeth 22. The back side of ring 30 extending radially between C and B may be thinned toward the perimeter to provide a concentric surface 34 lying in a plane parallel to roundel 28. In its simplest form, rotary saw blade 20 may be formed from a constant thickness disk having discrete angularly related concentric sections defined by roundel 28, ring 30 and band 32. Such disk can be formed into the shape sought by conventional metal forming techniques. Alternatively, rotary saw blade 20 may be formed from a disk blank by machining a shallow cone shaped surface 24 on one side extending radially from roundel 28, or from aperture 29, to a point short of the teeth or including the teeth and leaving the obverse side 36 planar, as shown in FIG. 4.

Referring jointly to FIGS. 5, 6 and 7, details of rotary saw blade 20 will be described. A shallow radially extending depression 50 is formed in cone shaped surface 24 and defined by outer circular wall 52 and inner circular wall 54. This depression is filled with a composition of abrasive material 26. Alternatively, an aperture disk of sandpaper or other element having a sanding or finishing function when passed across a work piece can be employed. To prevent protruding edge 56 of abrasive material 26 from performing a major part of the sanding function due to contact between the work piece and the protruding edge, the edge should not extend sufficiently to come into contact with the cut surface being made in the work piece by the teeth of the saw blade, which cut is represented by line 58. That is, the kerf to be cut can be wider than the width of band 32 by incorporation offset teeth 22, as illustrated in FIG. 5. Since, it may be easier to form the abrasive material 26 to an essentially constant thickness, there will be a protruding edge 57 of the abrasive material adjacent roundel 28. As this part of the abrasive material is essentially non-working, protruding edge 57 will have no effect upon the work piece. It is to be understood that the use of depression 50 is not inherently necessary as the abrasive material, whether a composition, sanding disk or the like can be formed directly upon or attached to surface 24 without a depression.

The operation of saw blade 20 will be described with reference to FIGS. 1 and 2. For purposes of the following description, it is assumed that work table 10 is a horizontal surface upon which work piece 14 is placed. A mandrel or arbor 60 penetrably engages aperture 29 and supports rotary saw blade 20 between a pair of washers 62, 64. The rotary saw blade is secured in place by nut 66 in threaded engagement with threaded shaft 68 disposed at the end of arbor 60. The axis of rotation 70 of arbor 60 is offset downwardly vertically from a horizontal plane 72 by an angle α. The angle α is equivalent to the cone angle of cone shaped surface 24. Thereby, a radial of the cone shaped surface extending vertically upwardly from the axis of rotation of arbor 60 will be perpendicular in three axis to work table 10. This radial is represented by line 74, as shown in FIG. 1. As this radial lies in the plane of the finished surface, the finished surface will extend vertically upwardly from the work table, as represented by the 90° angle. The cut made in scrap 18 of work piece 14 is represented by cut 76 which is coincident with the corresponding edge of teeth 20 defining line 40, as illustrated in FIG. 2. The angle of cut 76 is off vertical by an amount equivalent to the cone angle of the rotary saw blade and represented by 90° minus angle α.

More generally, and irrespective of whether the finished surface is to be perpendicular to the work table, the following criteria should dictate the orientation of the axis of rotation relative to the reference plane defined by the work table. The axis of rotation of the rotary saw blade should be oriented to place a radial of the abrasive surface orthogonal in two (2) axis to the relative direction of travel between the rotary saw blade and the work piece. This will define the plane of the finished surface of the work-piece.

As work piece 14 passes to the right, as shown in FIG. 1 in view of the counterclockwise rotation of saw blade 20, a saw cut 80 will be made to separate scrap 18 (on the far side of the saw blade). The saw cut in the work piece, as represented by line 58 in FIG. 5, will come into contact with abrasive material 26 at some point past edge 56 depending upon the amount of lateral offset of teeth 22. The totality of the cut surface of the work piece will be abraded, or sanded by abrasive material 26 to a varying depth depending upon the difference in lateral distance between each point on cut line 58 (see FIG. 5) in the work piece and a point on line 74 in alignment therewith in a plane parallel to work table 10. The portion or working area of abrasive material 26 actually performing the sanding function is represented by a section extending upwardly from work table 10 and having a rear limit defined by line 74. This section is designated by numeral 82 and identified by the parallel lines instead of by the stippling identifying the remaining surface of the abrasive material.

As will be evident to those skilled in the art, a cut surface other than vertical in work piece 40 can be achieved. A cut at any angle can be set by simply tilting arbor 60 in the vertical plane to the angle desired for the cut and then adding a number of degrees to the tilt angle equivalent to angle α.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. Apparatus for cutting and finishing a surface of a work piece, having a longitudinal axis which surface is perpendicular to the longitudinal axis of the work piece, said apparatus comprising in combination:

(a) a rotary saw blade having teeth disposed along its perimeter for making a cut in the work piece to form the surface on the work piece, said rotary saw including one and an other side and a cone shaped surface defining a shallow cone angle and disposed on the one side;

(b) abrasive material disposed upon the cone shaped surface of the one side for finishing the surface formed on the work piece; and (c) an arbor for supporting said rotary saw blade, said arbor having an axis of rotation offset from the longitudinal axis of the work piece by the cone angle.

2. The apparatus as set forth in claim 1 wherein the cone angle is in the range of 1–3 degrees.

3. Apparatus for cutting and finishing a surface of a work piece which surface is perpendicular to a longitudinal axis of the work piece, said apparatus comprising in combination:
   (a) a rotary saw blade having teeth disposed along its perimeter for making a cut in the work piece to form the surface on the work piece, said rotary saw including one and an other side and a cone shaped surface defining a shallow cone angle and disposed on the one side, the other side of said rotary saw blade being planar;
   (b) abrasive material disposed upon the cone shaped surface of the one side for finishing the surface formed on the work piece; and
   (c) an arbor for supporting said rotary saw blade, said arbor having an axis of rotation offset from the longitudinal axis of the work piece by the cone angle.

4. The apparatus as set forth in claim 1 wherein the other side of said rotary saw blade includes a depressed cone shaped surface.

5. The apparatus as set forth in claim 1 wherein said teeth are offset.

6. The apparatus as set forth in claim 1 wherein said rotary saw blade includes a central roundel and wherein said arbor includes attachment means for securing said roundel to said arbor.

7. The apparatus as set forth in claim 1 wherein said rotary saw blade includes an annular band and wherein said teeth are formed in said band, said band being radially aligned orthogonal to the axis of rotation of said rotary saw blade.

8. The apparatus as set forth in claim 1 wherein said abrasive material defines a concentric band disposed on said cone shaped surface.

9. The apparatus as set forth in claim 1 wherein said abrasive material comprises sandpaper.

10. The apparatus as set forth in claim 1 wherein said abrasive material comprises a composition of abrasive material adhered to said cone shaped surface.

11. Apparatus for cutting and finishing a surface of a work piece, said apparatus comprising in combination:
   (a) a rotary saw blade having teeth disposed along its perimeter for making a cut in the work piece to develop the surface of the work piece, said rotary saw blade having an aperture at its center and including one side and another side;
   (b) abrasive material for finishing the surface cut in the work piece by said teeth, said abrasive material being disposed upon the one side to define a shallow cone shaped surface extending radially inwardly for a substantial distance from a location radially inwardly from said teeth and defining a shallow cone angle with respect to a plane extending radially from the axis of rotation of said saw blade; and
   (c) an arbor engaging the aperture of said rotary saw blade for supporting said rotary saw blade and having an axis of rotation offset from perpendicular to a plane defined by the other side of said rotary saw blade by the cone angle.

12. The apparatus as set forth in claim 11 wherein the cone angle is in the range of 1–3 degrees.

13. The apparatus as set forth in claim 11 wherein the other side of said rotary saw blade is planar.

14. The apparatus as set forth in claim 11 wherein the other side of said rotary saw blade includes a depressed cone shaped surface.

15. The apparatus as set forth in claim 11 wherein said teeth are offset.

16. The apparatus as set forth in claim 11 wherein said rotary saw blade includes a central roundel and wherein said arbor includes attachment means for securing said roundel to said arbor.

17. The apparatus as set forth in claim 11 wherein said rotary saw blade includes an annular band and wherein said teeth are formed in said band, said band being radially aligned orthogonal to the axis of rotation of said rotary saw blade.

18. The apparatus as set forth in claim 11 wherein said abrasive material defines a concentric band disposed on said cone shaped surface.

19. The apparatus as set forth in claim 11 wherein said abrasive material comprises sandpaper.

20. The apparatus as set forth in claim 11 wherein said abrasive material comprises a composition of abrasive material adhered to said cone shaped surface.

* * * * *